United States Patent [19]
Smith, Jr.

[11] 3,742,265
[45] June 26, 1973

[54] SUPERCONDUCTING APPARATUS WITH DOUBLE ARMATURE STRUCTURE

[75] Inventor: Joseph L. Smith, Jr., Concord, Mass.

[73] Assignee: Massachusetts Institute of Technology, Cambridge, Mass.

[22] Filed: May 25, 1972

[21] Appl. No.: 256,962

[52] U.S. Cl.................. 310/52, 310/126, 310/198
[51] Int. Cl. ......................................... H02k 19/00
[58] Field of Search ................. 310/10, 40, 52, 165, 310/112, 126, 198, 169, 170, 171, 166, 1; 322/90; 323/51, 52; 336/120; 321/28

[56] References Cited
UNITED STATES PATENTS

| | | | |
|---|---|---|---|
| 1,673,673 | 6/1928 | Girault | 310/126 |
| 3,132,296 | 5/1964 | Nippes | 322/90 |
| 3,141,101 | 7/1964 | Ketay | 310/171 X |
| 3,223,916 | 12/1965 | Shafranek et al. | 321/28 |
| 3,440,456 | 4/1969 | Grünwald et al. | 310/10 |
| 3,441,755 | 4/1969 | Grünwald et al. | 310/10 |
| 3,470,396 | 9/1969 | Kafka | 310/10 |
| 3,471,726 | 10/1969 | Burnier et al. | 310/10 X |
| 3,551,784 | 12/1970 | Shaw et al. | 310/198 X |
| 3,564,307 | 2/1971 | Kawape et al. | 310/165 X |
| 3,644,766 | 2/1892 | Hughes | 310/165 |
| 3,670,187 | 6/1972 | Thum | 310/10 |

Primary Examiner—D. F. Duggan
Attorney—Arthur A. Smith, Jr., Robert Shaw et al.

[57] ABSTRACT

Rotating electric machinery and the like wherein the magnetic iron cores of the apparatus are replaced by a superconductor winding which provides a high intensity field for electromagnetic interaction within the machinery. The apparatus described contains a first armature which is always wound and which, when energized, has an armature field which has motion relative to the armature. The field of the superconducting winding and the field of the armature in operating apparatus are locked together, but are permitted to have small relative angular displacement therebetween. A second armature which may or may not be wound, depending upon the particular embodiment of the apparatus is disposed in the gap between the superconducting winding and the wound armature. The second armature carries electric currents induced or otherwise created therein, these electric currents interact with the field in the gap to create mechanical forces upon the second armature. These forces are reaction-type forces and equal and opposite to the reaction occurring upon the wound armature thereby removing all or substantially all reaction forces from the superconductor winding.

19 Claims, 9 Drawing Figures

SUPERCONDUCTING APPARATUS WITH DOUBLE ARMATURE STRUCTURE

The present invention relates to superconducting-type electrical machinery, and in particular, to machinery wherein the field-creating function of the iron magnetic cores of conventional type machinery is replaced by a superconductor winding.

In order to keep the present specification to a reasonable size, applicant hereby incorporates by reference the following applications for Letters Patent, journal article and theses: application Ser. No. 166,083, filed on July 26, 2971, by the present inventor; application Ser. No. 210,088, filed on Dec. 20, 1971 by the present inventor and another; a journal article entitled "The Application of Superconductors in the Field Windings of Large Synchronous Machines," by Woodson et al., IEEE Transactions of Power Apparatus and Systems, vol., PAS 90, No. 2, June 1971, a copy of which is in the U.S. Pat. Office Scientific Library; the doctoral thesis of David L. Luck entitled "Electromechanical and Thermal Effects of Faults Upon Superconducting Generators" (M.I.T. libraries on or about June 28, 1971); the doctoral thesis of James L. Kirtley entitled "Design and Construction of an Armature of an Alternator with a Superconducting Field Winding" (M.I.T. libraries on or about Oct. 26, 1971, as well as United States Patent Office Scientific Library); the masters thesis of John Paul Kelsey entitled "A static Analysis of a Synchronous Transformer," (M.I.T. libraries in or about June 1972); the doctoral thesis of David L. Greene entitled "Analysis of a Marine Propulsion System Incorporation Superconducting Electrical Machinery" (M.I.T. libraries on or about June 24, 1970); the masters thesis of John H. Murphy entitled "High Vacuum Shaft Seals for a Superconducting Generator" (M.I.T. libraries on our about Feb. 25, 1971); the masters thesis of James C. Dudley entitled "Fabrication of an Armature for a Generator with a Superconducting Rotating Field Winding" (M.I.T. libraries on or about June 24, 1969); and the masters thesis of W. David Lee entitled "Continuous Transfer of Liquid Helium to a Rotating Dewar" (M.I.T. libraries, on or about Sept. 10, 1970). for rotating-type electrical machinery and the like has the distinct advantage of permitting very high intensity magnetic fields in the airgap, but this is accomplished by several distinct disadvantages. First, of course, the superconducting windings in the present state of the art are unsuitable for carrying an alternating current; and, second, it is difficult to provide adequate mechanical support for a superconducting winding in rotating machinery while nevertheless providing the thermal isolation necessary for such a winding. It is the principal object of the present invention, therefore, to provide electrical apparatus which overcomes both of the foregoing drawbacks, while nevertheless taking advantage of the very high magnetic fields available from superconductor-type windings.

A further object is to provide a superconducting transformer.

Another object is to provide a superconducting induction motor.

A still further object is to provide a superconducting D-C motor.

Still another object is to provide a reaction shield for superconducting apparatus.

A still further object is to provide in rotating electrical apparatus the high field intensities necessary to permit the high concentration of electrical energy in a relatively small volume but without the need for the ferromagnetic cores employed in conventional apparatus.

These and still further objects are pointed out in the description to follow and are particularly delineated in the appended claims.

By way of summary, the foregoing objects are embodied in a dual-armature superconducting machine that includes a superconductor winding adapted to connect to a source of electric energy and to provide a high intensity magnetic field in the airgap of such machine. A first, normally conducting, would armature is disposed in the region of influence of the magnetic field of the superconductor field winding. A second, normally conducting armature (which may or may not be wound, as the case may be) is disposed in the gap between the superconductor field winding and the first armature. The field of the superconductor winding, when the coils thereof are energized, interacts with an electric current in the first armature. The field of the superconductor winding also interacts with electric currents in the second armature. The second armature acts as a reactions armature to such field to shield the reaction occurring at the first armature from the field winding. In this way the machine develops its interaction torque between normally conducting members (the superconductor winding being isolated from such torque), but the magnitude of the interaction torque is a function of the high-intensity field of the superconductor winding.

The invention hereinafter described with reference to the accompanying drawing in which.

In the explanation to follow the electrical machinery described is first discussed in connection with apparatus adapted to perform a superconducting transformer function. In this apparatus the superconducting winding is on a rotor and is free spinning. The rotor is the central member of a three-member unit, the other two members of which are, first and second armatures, the first armature being the working member of the unit and the second armature being sandwiched between the superconductor winding and the first armature. It will be appreciated that, conceptually, the superconductor winding need not be the central winding, and, conceptually, the second armature need not be placed between the field winding of the unit and the first armature. However, economic and other constraints place great importance on this particular configuration. The description continues thereafter with a discussion of a superconducting induction motor, then a superconducting D-C motor; and, finally, a description of a shielded superconducting generator. Furthermore, although the description sometimes refers only to a motor function or only to a generator function, the apparatus discussed can perform as either.

Figure 1:
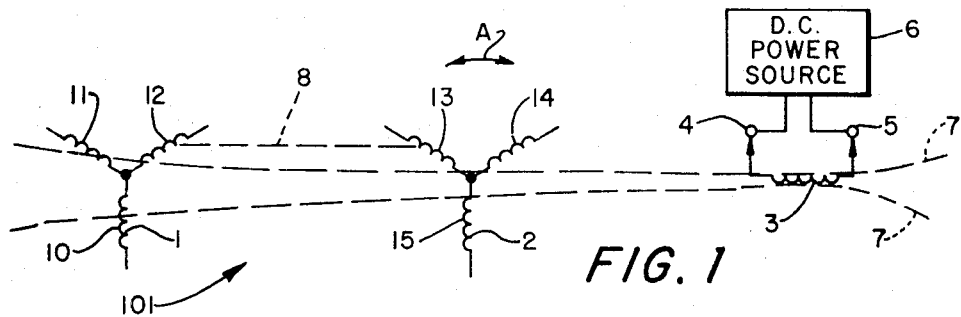
FIG. 1 is a schematic circuit diagram of one embodiment of the invention and shows a field winding, which in the present invention is a superconductor, and first and second armatures.
Figure 2:
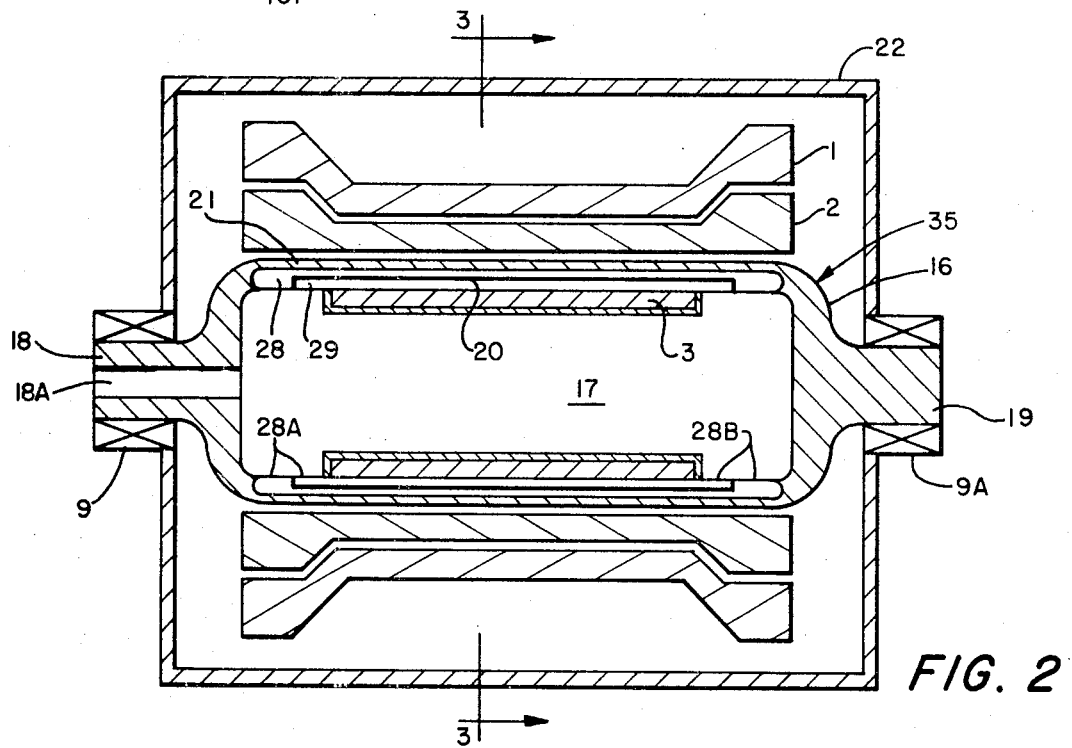
FIG. 2 is a diagrammatic side section view of a machine containing the field winding and the two armatures.
Figure 3:
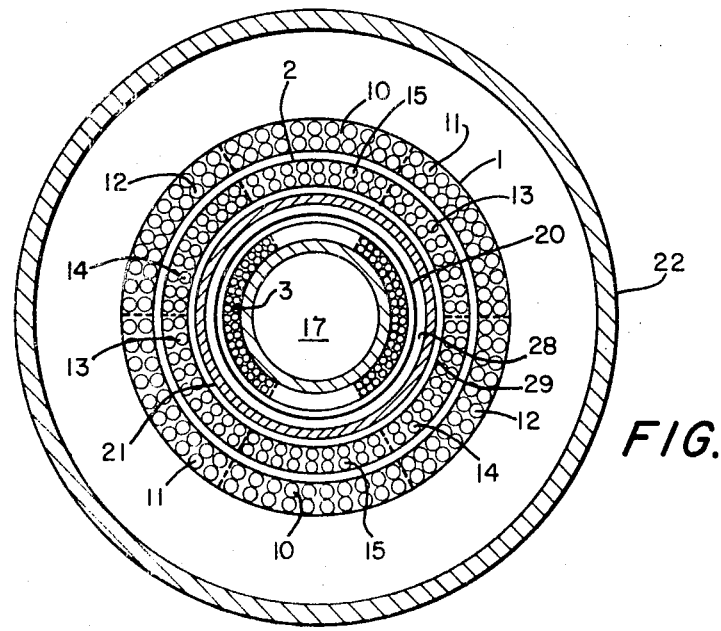
FIG. 3 is a view taken upon the line 3—3 in FIG. 2 looking in the direction of the arrows.

The apparatus designated 101 in FIGS. 1, 2 and 3 is a dual-armature, superconducting, rotating-electrical machine with no ferromagnetic core in either the armature-portion or the field-portion thereof. In the embodiment in FIGS. 1, 2 and 3 the machine functions as a transformer and/or as a synchronous condenser, and includes, in combination, a superconductor field winding 3 adapted, through slip rings 4 and 5 or the like, to connect to a D-C source of electric energy 6 to produce a high intensity magnetic field 7 (~30,000 gauss to 60,000 gauss and above). A first, normally conducting, multi-full-turn wound armature 1 is located in the region of influence of the rotating D-C (i.e., steady or of constant magnitude relative to the rotating field winding) magnetic field 7 of the superconductor field winding 3. A second, normally conducting, reaction armature 2 is disposed in the gap or space between the superconductor field winding 3 and the first armature 1. Flux lines of the field 7, as shown, link the turns of both the armatures which are shown in FIG. 1 to be three-phase devices. The coils numbered 10, 11 and 12 of the first armature are electromagnetically coupled with the coils numbered 13, 14 and 15 of the second armature, as well as with the field 1, so that any change in an electric current in the coils of one tends to effect changes in the electric current in the coils of the other. The armatures 1 and 2, in the machine of these three figures, are mechanically secured together as is indicated by the dotted line shown at 8, but the angular position of the coils of one armature can be changed relative to the other (as indicated by the arrow labeled A) thereby to change the relative timing of the currents; that is, the timing of the phase of the output, which is the three-phase armature 2 in FIG. 1, as hereinafter noted, can be changed relative to the timing of the phase of the input to the three-phase armature 1. Said another way, the electrical phase angle between the primary and secondary of the three-phase transformer 101 shown can be changed, and with some very beneficial and, heretofore, unattainable consequences.

The first armature 1 is the primary of the transformer 101, as mentioned, and is, thus, adapted to connect to a source of electric energy (not shown). The second armature 2 is the secondary of the transformer 101 and is, thus, adapted to connect electrically to a load (also not shown). The machine 101, as best shown in FIG. 3, is a concentric configuration in which the cylindrical-like shaped field winding 3 is positioned at the center part thereof; the field winding 3 is free to rotate upon bearings 9 and 9A about its axis as a free-spinning rotor element, the first and second armatures also cylindrical-like in shape, being disposed coaxially about the cylindrical field winding. The electrical current in the energized first polyphase armature 1, interacts with the D-C magnetic field of the rotor 3 causing the latter to rotate at synchronous speed about said axis. Since the rotor field 7 links the polyphase winding of the armature 2, it induces voltages in the coils 13, 14 and 15 thereof. The magnitudes of the induced voltages are a function, among other things, of the magnitude of the high-intensity D-C field of the superconductor winding 3 and can, therefore, be quite high. With no load connected to the electrical terminals of the three-phase armature 2 and with a field current in the field winding 3 for zero reactive power, the voltage in the primary armature 1 matches the connected infinite bus (the machine 101 is assumed here to be operating as a step-down converter), and the voltage induced in the secondary armature winding is the no-load, open-circuit secondary voltage. At this juncture the only steady mechanical forces acting upon the superconductor coils of the winding 3 are centrifugal and self-magnetic forces. As later noted, the winding operates in a high vacuum enclosure which eliminates windage forces, and inertial forces occur only upon starting and during transient condition whenever the load on the transformer 101 changes. At this juncture the current in the secondary armature 2 is zero and the current in the primary armature 1 is the no-load current of the device, a back emf in the armature 1 being provided by the field 7. If now, an electrical load is connected to the terminals of the secondary armature 2, the current that flows therein will interact with the field 7; that interaction will be sensed by the primary armature 1 and will cause a matching current to flow therein (on the basis of transformer principles). The current in the armature 1 will also interact with the field 7. The primary and secondary currents thus provide reaction forces between their respective armature and the field 7; however, the reaction force created by the current in the first armature 1 acts to counteract precisely the reactive force created by the current in the second armature 2, and vice versa, thereby allowing all reaction forces (other than transients, as noted) to be taken up by the normally conducting armatures and thereby reducing to zero the reaction forces upon the winding 3, due to the electrical load connected to the secondary of the transformer 101. An outer eddy-current shield 22 serves to contain the very high magnetic field 7 within the apparatus 101.

Since the rotary field winding 3, during transient conditions, must withstand its own inertial force as well as that of its associated parts, it is incumbent that the inertia of the rotor, labeled 35, be minimized. The manner in which such minimization is achieved is not detailed here nor are details of the rotor itself since both are discussed in said application Ser. No. 210,088 and in the Woodson et al. journal article, among others. Some aspects of the rotor, however, are now mentioned. It consists of the superconductor winding 3 wound about a shell 16 which narrows to shafts 18 and 19 at its opposite ends to be received by the bearing 9 and 9A. A thermal radiation shield 20 and vacuum spaces 17, 28 and 29 serve thermally to isolate the winding 3. The outside of the shell 16, numbered 21, performs electrical shielding functions and also performs the function of a damper winding to provide, by induction, acceleration torque for spin up to near synchronous speed. Liquid helium to maintain a cryogenic environment about the winding 3 is delivered by transfer tubes which pass through a rotary seal in a duct 18A in the shaft 18, as is described in the Lee thesis and in an application for Letters Patent entitled "Relatively Rotatable Cryogenic Transfer System," of the present inventor. The rotor 35 thus serves as a dewar for the D-C winding 3 which is a part thereof, isolating the winding thermally. It can be seen, however, even in the somewhat schematic showing in FIG. 2, that the rotor is mechanically somewhat fragile in nature. Thus, all mechanical forces upon the winding 3 must be transferred to the bearings 9 and 9A through thin-wall portions 28A and 28B which are minimized in thickness to reduce heat transfer to the winding. Electrical leads to the superconductor winding 3 pass through the duct 18A. The three phase windings of the armatures 1 and 2 are preferably like the windings discussed in great detail in said application Ser. No. 166,083 and in said Kirtley thesis; and forced oil cooling and insulation may be accomplished in the manner discussed in said application Ser. No. 210,088. Either or both armature windings can, of course, be of more conventional construction. Both armature winding, however, are made of normally conducting coils; indeed, all the elements in FIGS. 1, 2 and 3, including the bearings 9 and 9A, the armatures 1 and 2, etc. operate at room temperature (plus operating temperature increases) and they can, therefore, be mechanically supported adequately to withstand the very high mechanical stress encountered by the use of the apparatus. When an electrical load is connected to the three-phase armature 2, the current flows therein tends to slow the angular velocity of the winding 3 by means of negative torque. tending to cause the field 7 to lag behind the field of the armature 1. This causes an increase in the current in the current in the armature 1 to maintain the rotational speed of the rotor winding 3 by means of a positive torque which exactly matches the negative torque exerted by the increase in load on the armature 2. In effect the rotor winding 3 plus the armature 2 behave as a synchronous generator and the rotor winding 3 plus the armature 1 behave as a synchronous motor. The net torque in the rotor winding 3 is zero except for transients. When the machine 101 is run underexcited there is a net reactive power to the machine and it is inductive; when the machine is run over-excited, the net reactance is capacitive. Thus the machine 101 combines the function of a transformer and the function of a synchronous condenser. Mention is made above of changing the angular position of the windings of the armatures 1 and 2 by moving one relative to the other by some arc A. This makes possible controllable transfer of power between two power systems independent of relative electrical phase angle between the two systems. The relative positions can be changed by appropriate gearing of one or both of the armatures and changes in position can be effected by servo devices. Since an explanation of the particular implementation is not necessary for purposes of the present disclosure and since mechanical means to accomplish this end is known in the art, nothing further is mentioned herein; however, the consequences of changing relative angular positions of the armatures 1 and 2 are discussed in are discussed in detail in the Kelsey thesis.

Figure 4:
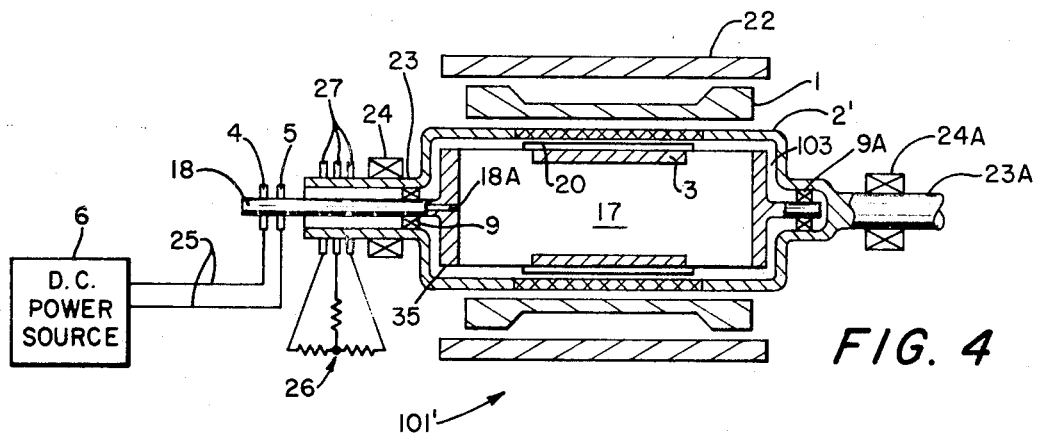
FIG. 4 is a diagrammatic side section view of a modification of the apparatus of FIG. 2.

The superconducting synchronous condenser (or transformer) 101 in FIGS. 1–3 can be converted to an induction motor by replacing the armature 2 with a rotatable resistive winding or conductive shell, and this is done in the apparatus of FIG. 4 wherein the rotatable resistive winding or conductive shell is labeled 2' to show that the function thereof is similar to that of the armature 2 but that the circumstances have changed. In FIG. 4, as well as in the further figures, those elements which perform the same function as in previously discussed systems are given identical numbers to those in the prior systems; only those elements whose character has been modified have different numbers, but wherever practical the new numbers are arrived at by priming the old numbers.

In the induction machine designated 101' in FIG. 4, a load is applied to the system by way of a shaft 23A. The armature is again three-phase (but, of course, need not be) and is energized by an outside source of electrical power to drive the superconductor winding 3 at synchronous speed, as before. The armature 2' (which can be a winding like that of a conventional wound rotor motor, or a conductive shell, or a squirrel cage) under no load conditions also rotates at synchronous speed and thus does not influence the synchronous condenser action of the machine. When the field current is adjusted for zero reactive power, the voltage induced in the aramture 1 (i.e., the stator) matches line voltage. When a torque or load is attached to the shaft 23A of the induction torque 101', however, a slip develops between the induction winding 2' and the field 3 which induces sufficient current in the induction winding to drive the load. As a result of the induced currents, a phase shift occurs between the rotating field and the line voltage applied to the armature 1 so that the armature 1 draws power from the bus. Again, the torque developed in the armatures 2' to satisfy the load requirements is matched by an equal but opposite torque on the armature 1 (the function being that respectively of the rotor and stator of a conventional induction motor), but the magnitude of the action and reaction torques is again a function of the very high intensity magnetic field of the superconductor winding 3.

The shaft 18 in FIG. 4 is shown extended outward to receive the slip rings 4 and 5 energized by exciter leads 25 from the D-C power source 6. The shell armature 2', as shown, is reduced at one end to form the shaft 23A and at the other end to form a shaft 23 to receive bearings 24A and 24, respectively. The armature 2' illustrated is wound to allow introduction of resistances 26 in series therewith, through slip rings 27, to effect changes in the torque characteristics of the armature 2'. In effect this machine is a synchronous condenser with an eddy current clutch exerting torque on the airgap flux. Since both the field and the eddy current winding are rotating, the power extracted from the air-gap flux is the air gap torque times the speed of the eddy current winding (i.e., the armature 2'). The rotor 35 is disposed within the cavity labeled 103 which is fitted with suitable seals and evacuated; in FIG. 4 the shield 20 can also perform the function of a damper winding.

Figure 5:
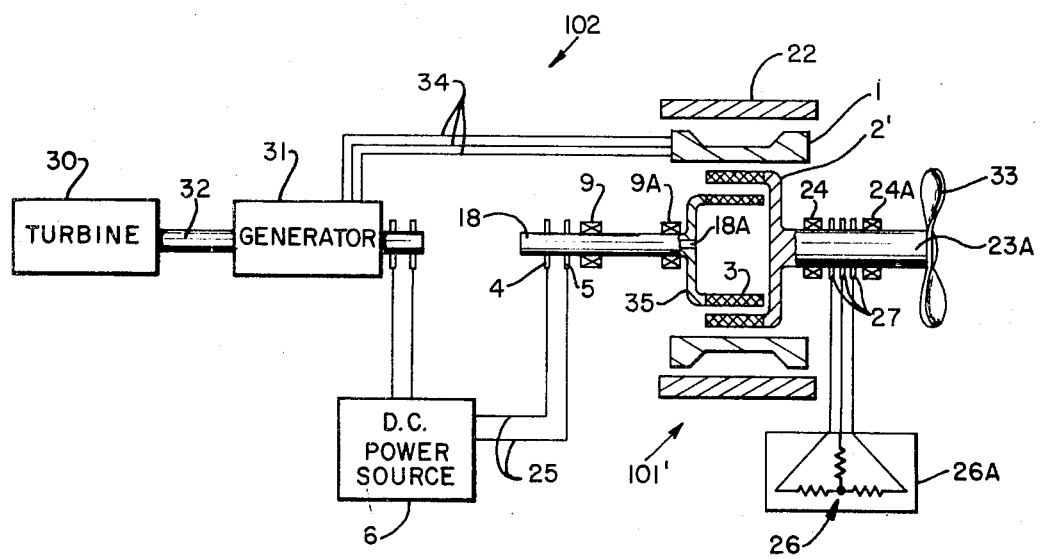
FIG. 5 is a diagrammatic side section view of another modification of the apparatus of FIG. 2 and shows some portions of the system in block diagram form.

The synchronous-induction motor 101' can be applied to a ship drive system 102 as shown in FIG. 5. In the system illustrated a high speed prime mover 30 (a turbine machine) drives a high speed superconducting alternator or generator 31 through a shaft 32. The generator 31 should have a small number of pole pairs. A-C power is transmitted to the synchronous induction motor 101' by a bus 34. The stator winding 1 has enough more pole pairs than the generator 31 to produce a synchronous speed somewhat about top speed of the ship's propeller labeled 33. The free-spinning superconductor field winding 3 runs at the synchronous speed of the motor. In FIG. 5 the numeral 35 designates a rotor which carries the superconductor winding 3 and a normally conducting damper winding (not shown). The shaft power to drive the propeller is extracted by the induction winding 2' which runs at a speed below synchronous speed.

Two methods are available to control the power delivered to the propeller 33. For a given slip in the motor, the torque can be changed by changing the air gap flux of the motor. This can be accomplished by changing the exciter current for both the motor 101' and the generator 31 proportionally so as to change the voltages while keeping the motor and generator voltages matched, the generator 31 being also excited by the source 6, as shown. This would correspond to terminal voltage control of a conventional induction machine. For large slip speed the external rotor resistances 26 may be changed to obtain more desirable torque-slip characteristics.

The system shown in FIG. 5 is also adaptable to dynamic braking. If the bus 34 is disconnected from the generator 31 and connected to a bank of resistors (not shown), the field produced by the synchronous rotor 3 will be rotated by the induction armature 2'. With a negative slip mechanical power will be extracted from the propeller and the electric power generated in the stator 1 will be dissipated in the resistor bank. The motor is thus acting as an induction generator. The braking torque can be controlled by changing the field current and/or by changing the resistance of the external resistances 26.

When the forward speed has been reduced to the extent that the propeller speed is too slow for adequate braking, the motor 101' in FIG. 5 may be reversed by connecting the bus 34 to the generator with a reversed phase sequence. Before reconnection in reverse, the field current and, hence, the terminal voltages of both motor 101' and the generator 31 are zero. As the field current on the generator 31 is slowly increased, the damper winding on the synchronous rotor 35 stops the rotor and then accelerates it to near synchronous speed in the reverse rotation. As the excitation is slowly increased on the superconductor winding 3 of the rotor 35, the rotor is pulled into step. During the reversing procedure the winding of the armature 2' is kept open circuited so that the propeller is free running. When the armature 2' is reclosed onto the external resistors 26, the propeller 33 receives a reverse torque. As the reverse torque is increased by excitation or resistance control, the propeller may be stopped and reversed In overall operation the electric ship drive shown in FIG. 5 consists of a synchronous, constant-ratio, electric reduction gear which reduces the angular shaft speed and increases the torque in a corresponding ratio. The torque is applied to the propeller by an eddy current clutch which employs the high-intensity flux produced by the low speed synchronous motor 35. The system 102 utilizes machines which are very compact and efficient as are superconducting synchronous machines. The eddy current clutch (i.e., the armature 2') is also very compact since it utilizes the high magnetic flux produced by the superconductor field winding 3.

The system 102 could also be utilized in a reversed configuration with a superconducting induction generator driven by a prime mover 30 and with a superconducting multipole motor driving the propeller. In this configuration the prime mover would drive the induction winding in the generator at a negative slip relative to the free-spinning synchronous field winding. The free generator rotor and the propeller would run locked together at the synchronous speed ratio. This configuration might be more compact if the field strength and the tip speed were higher in the generator than in the motor.

In either configuration a major advantage of this A-C drive system is that it does not require power conditioning equipment in the main power circuit. The system can be operated with conventional, rugged, excitation apparatus and switch gear. As with other A-C systems the voltages can be high enough to keep conductor sizes small.

Instead of containing the resistances 26, the block labeled 26A can contain a separate source of A-C power of frequency $f_2$ connected through the slip rings 27 to the windings making up the armature 2'. The angular velocity of the armature 2' will, in this circumstance, be a function of either the sum or the difference frequencies of an input frequency $f_1$ to the armature 1 and the frequency $f_2$, depending upon whether A-C power is drawn from the supply at $f_2$ or A-C power is delivered by the armature 2' back to the supply at the frequency $f_2$.

Figure 6:
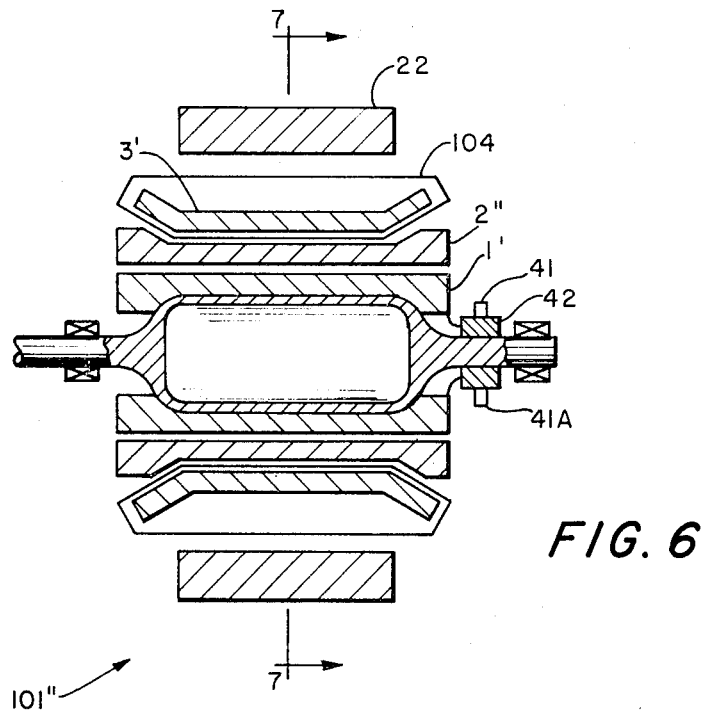
FIG. 6 is a diagrammatic side section view of still another modification of the apparatus of FIG. 2.
Figure 7:
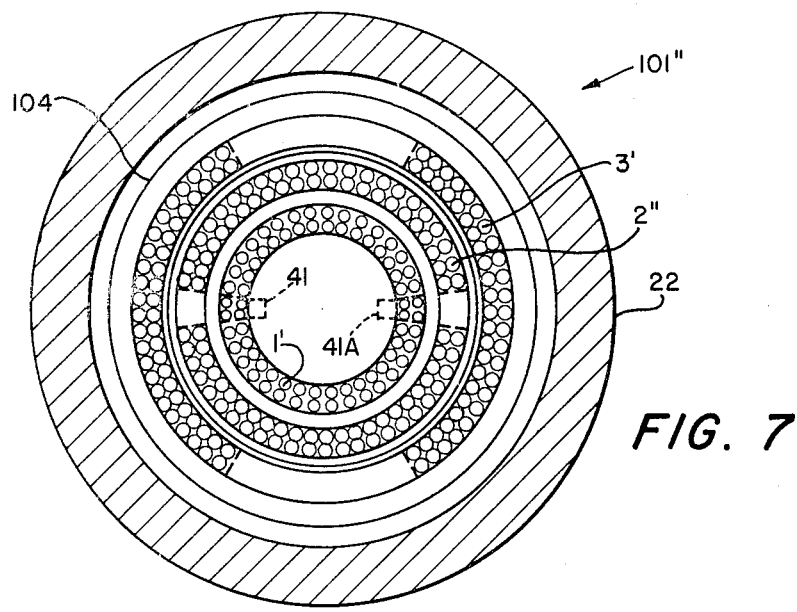
FIG. 7 is a view taken upon the line 7—7 in FIG. 6 looking in the direction of the arrows.

The apparatus shown at 101'' in FIGS. 6 and 7 is a commutated D-C machine with a superconductive field winding. Briefly summarized, the superconductor field winding, which is designated 3' in these two figures, is on the stator and is housed within a dewar 104. The normally conducting reaction armature labeled 2'' is also on the stator. The first armature numbered 1' is the rotor of the machine 101''. Again the motor 101'' has no ferromagnetic material in the magnetic circuit but may be surrounded by the magnetic shield 22 if the D-C field of the superconductor winding 3' must be kept within the confines of the machine; and again the action-reaction torques needed to drive a load are taken by the normally conducting armatures 1' and 2'', as now explained.

In the machine 101'', the superconductor field winding 3' is stationary in space (i.e., on the stator of the machine) and is the outermost of the basic three elements making up the machine of FIGS. 6 and 7; the first armature 1', being the innermost of the three, is free to rotate and is connected through a shaft 40 to a driven load. The second armature 2'' is sandwiched between the other two elements and is also stationary in space (i.e., on the stator of the machine). The first armature contains coils (which can be coils of a conventional D-C machine, but which preferably would be coils modified to effect appropriate cooling and to recognize the absence of an armature core) connected through brushes 41 and 41A to a cummutator 42. The second armature 2'' contains coils electrically identical to the coils of the first armature and these coils are also connected through the brushes 41 and 42A to the commutator 42. In this way the coils making up the two armatures are connected in series; there may be adjustable series resistances also in the circuit. Electric currents in the two armatures, as before, interact with tthe high intensity D-C field 7; but, ideally the action-reaction is again between the normally conducting armatures 1' and 2'' so that the reaction torque upon the armature 1' is taken by the armature 2'' and the reaction torque upon the superconductor field winding 3' is greatly reduced or reduced to zero. In the apparatus of FIGS. 6 and 7, the second armature 2'' can conceptually be a rotatable element, the connection to the armature 1' being made through ffurther brushes and a further commutator. Also, as is true of more conventional D-C machines, the apparatus illustrated in FIGS. 6 and 7 and described above can be utilized as a D-C generator with the same advantages as when employed as a D-C motor.

Figure 8:
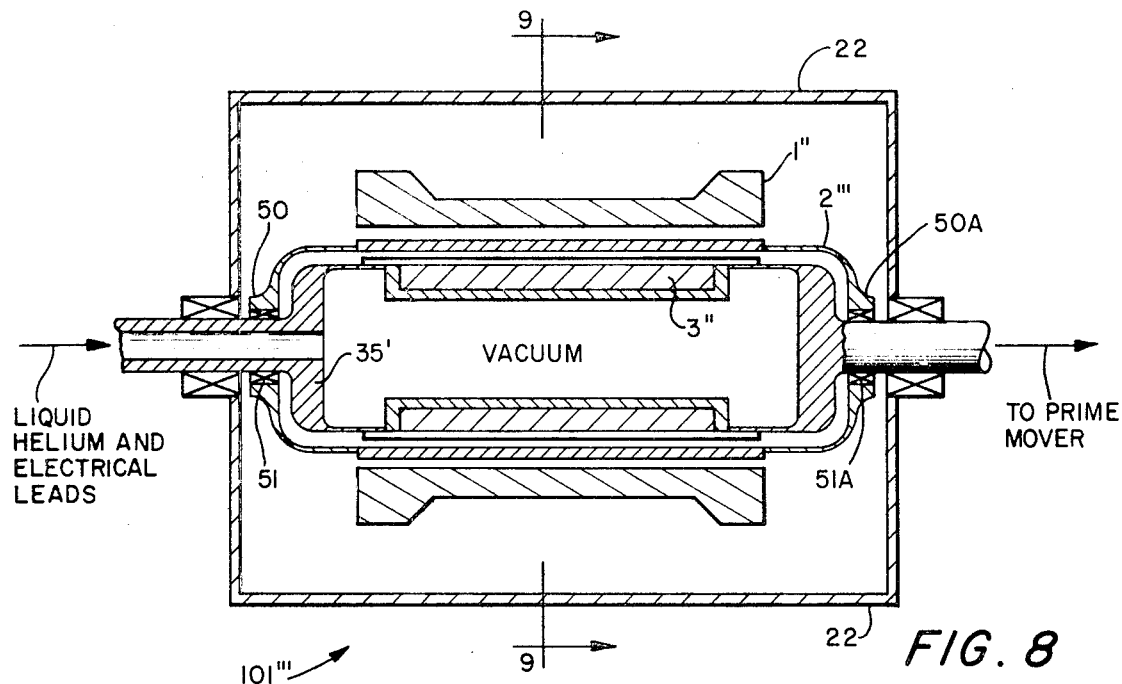
FIG. 8 is a still further modification of the apparatus of FIG. 2.
Figure 9:
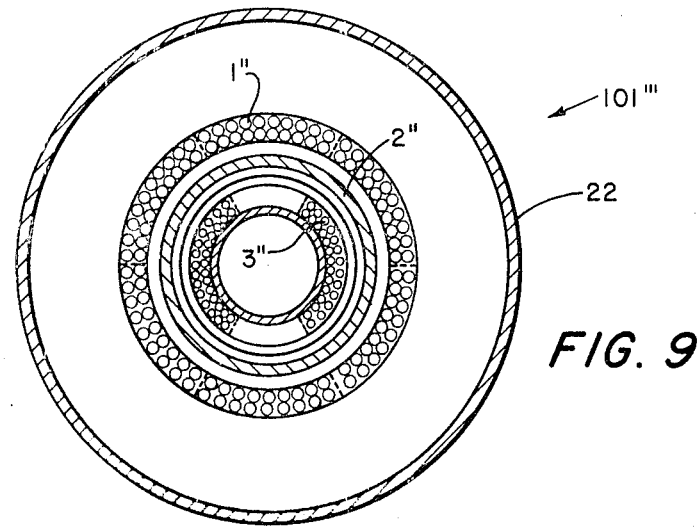
FIG. 9 is a view taken upon the line 9—9 in FIG. 8 looking in the direction of the arrows.

The machine 101''' in FIG. 8 is an alternator, like that shown in said application Ser. No. 210,088 and in the Kirtley thesis, except that there is interposed between the field winding labeled 3'' and the first armature labeled 1'', a conductive inertial shell armature 2''' which is free spinning and which will, therefore, in ordinary conditions, rotate at the same speed as that of the field winding 3''. In the event of a fault in the circuit of the first armature 1'' or in the load connected thereto (since the machine 101''' is an alternator adapted to connect to an electrical load), the field linked by the armature 1'' will lock into the winding 1'' at the position of the field when the fault condition occurred. The mechanical inertia of the rotor, which is labeled 35' in this figure, causes the rotor 35' to continue to rotate against the large torque (seven to 10 times full load torgue) required to pull the magnetic poles of the field winding 3'' away from the magnetic poles locked into the armature winding by the fault. The torque reaches a maximum after 90° rotation. At 180° rotation the poles are opposed and the torque goes to zero. Beyond 180° rotation the poles attract and an accelerating torque tends to speed the rotation until a complete revolution whereupon the cycle starts again.

In the machine 101''', however, the fault torque acts on the conducting shell 2'''. In the initial one-half revolution after a fault, the energy to pull the magnetic poles apart comes from the rotational kinetic energy of shell 2''', slowing the shell slightly. In the second one-half revolution the poles attract and the shell is re-accelerated back to the original rotational speed.

The shell 2''' is composed of an electric shield and/or damper shell as described in the Luck thesis. In addition, however, the armature shell 2''' must have adequate inertia and must be free to rotate relative to the field winding 3'' when subjected to these large alternating torques which occur at machine frequency during fault conditions. The suspension between the field winding 3'' and the inertial shell/electric shield 2''' is designed so that the fault torques move the shell relative to the rotor and the largest part of the torque reacts against the shell 2''' changing its angular momentum so that only a small fraction of this torque is transmitted through the suspension to the field winding 3''. To accomplish this end, the second armature 2''' is supported at its ends 50 and 50A by bearings 51 and 51A, respectively, to provide free rotation of the shell. The inertia of the shell is large enough so that the relative displacement between the shell 2''' and the field winding 3'' is relatively small, thus only a small fraction of the fault torque is transmitted to the field windings 3'' by the electromechanical interactions associated with the magnetic field of the field winding 3''.

The suspension of the inertial shell may be of several designs. If the suspension is a torsional spring, the natural frequency of the suspension must be considerably lower than machine frequency but well above the swing frequency of the generator rotor. Some mechanical damping between the rotor 35' and the shell 2''' is also desirable. The lower limit on the natural frequency is set by the requirement that the shell must also serve as a damper winding for machine rotor swings. This requires that the rotor 35' and shell 2''' act essentially as a rigid unit as the rotor accelerates and decelerates during transient swings.

On the other hand the shell suspension can be a plastic-element coupling, the coupling being rigid at the level of torques required for machine damping and for shielding the machine rotor from negative sequence and higher harmonic fields but, under severe fault conditions, being rotatable by means of plastic shear. A soft metal such as indium or other metals or plastics can be used as the shear element.

The advantage of this method of fault protection is that the large torsional forces are carried directly to the inertia of the conducting shield which is carrying the image currents set up by fault current in the armature. With this inertial-shell protection the high fault torques do not have to be transmitted along the shell to the machine shaft and along the shaft to accelerate the inertia of the prime mover. Thus the damper shell and the machine shaft do not have to be designed for fault torque, but only for somewhat more than steady state torque.

It will be appreciated in view of the foregoing discussion, that the particular configurations illustrated represent preferred arrangements in the present state of the art; but positioning of the various elements (e.g., interchanging of the stationary and rotary elements) and changing of the shape and position (e.g., replacing the concentric, nested configuration with a concentric, aadjacent configuration, as when the three elements are formed in the shape of discs rather than the elongated cylindrical configuration shown) may prove more desirable in the light of developments in the art.

Further modification of the invention herein described will occur to persons skilled in the art and all such modifications are considered to be within the spirit and scope of the invention as defined in the appended claims.

What is claimed is:

1. A dual-armature superconducting rotating electrical machine that eliminates the need for ferromagnetic core in either the armature portion or field portion that comprises, in combination: a superconductor field winding adapted to connect to a source of electric energy and to provide a high-intensity D-C magnetic field; a first normally conducting multi-full-turn wound armature disposed in the region of influence of the D-C magnetic field of the field winding; and a second, normally conducting reaction armature disposed in the gap between the superconductor field winding and the first armature, flux lines of the D-C magnetic field linking the turns of the first armature and conductive portions of the second armature, the field winding and at least one of the armatures being adapted to permit relative angular motion therebetween, electric currents in each armature interacting with the D-C field to provide reaction forces therebetween the reaction force created by the current in the second armature acting to counteract the reaction force created by the current in the first armature thereby to allow substantially all the reaction forces to be taken up by the normally conducting armatures and to reduce the reaction force upon the superconductor field winding.

2. Apparatus as claimed in claim 1 in which both the first and second armatures contain polyphase windings electromagnetically coupled to one another so that any change in an electric current in the coils of one armature will induce a change in the coils of the other and in which the first and second armatures are mechanically secured to one another.

3. Apparatus as claimed in claim 2 in which the first armature is the primary of a transformer and is, thus, adapted to connect to a source of electric energy, and in which the second armature is the secondary of the transformer, the machine being a concentric configuration in which the field winding is cylindrical-like in shape, is at the center of the concentric configuration, and is free to rotate about its axis as a free-spinning rotor element, the first and second armature being also cylindrical-like in shape and disposed coaxially about the cylindrical field winding, the first polyphase armature being adapted to be energized and to effect synchronous rotation of the field winding about said axis to provide a rotating field which induces a back emf in the first armature and which interacts with the polyphase winding of the second armature to induce voltages in the coils thereof.

4. Apparatus as claimed in claim 1 in which the machine comprises three concentric and coaxial cylindrical elements, the second and first armatures being disposed respectively outward from the field winding.

5. Apparatus as claimed in claim 4 in which the cylindrical field winding is the center element of three.

6. Apparatus as claimed in claim 4 in which the field winding and the second armature are free to rotate and in which the first armature is stationary in space and comprises polyphase A-C coils operable, when energized, to provide currents which interact with the high intensity D-C field to effect synchronous rotation of the field winding and its D-C field which in the course of such rotation links the conductive portions of the second armature thereby causing the second armature to rotate under the influence thereof, output shaft means being provided as part of the second armature to allow mechanical coupling to a driven load.

7. Apparatus as claimed in claim 6 in which the second armature is wound and in which the windings thereof are connected to slip rings to permit variable resistance elements to be connected in series with the armature coils thereof to permit modification of torque characteristic of the machine.

8. Apparatus as claimed in claim 6 in which the second armature is wound, the windings making up the second armature being connected to slip rings, and in which there is provided a separate service of A-C power connected to the slip rings, the angular rotational speed of the second armature being a function of either the sum or difference of the frequency of the separate source and the frequency of the A-C input to the first armature.

9. Apparatus as claimed in claim 6 in which the second armature is of squirrel cage construction.

10. Apparatus as claimed in claim 6 in which the second armature is a conductive cylindrical shell caused to rotate because of interaction between the rotating field and eddy currents induced in the shell.

11. Apparatus as claimed in claim 1 in which the superconductor field winding and the first and second armatures form three concentric and coaxial substantially cylindrical elements.

12. Apparatus as claimed in claim 11 in which the superconductor field winding is stationary in space and is the outermost of the three elements, the first armature is the innermost of the three elements, is free to rotate and is shaft connected, and the second armature is sandwiched between the other two elements and is stationary in space, the first armature comprising wound coils connected to commutator means secured as part of the rotatable first armature, the second armature comprising wound coils electrically connected through the brushes to the commutator means, the coils of the first armature being thereby serially connected to coils of the second armature.

13. Apparatus as claimed in claim 1 in which the machine comprises three concentric nested elements and in which the field winding is the center element of the three and is secured to a shaft for connection to a prime mover to effect rotation of the field winding.

14. Apparatus as claimed in claim 13 in which the first armature is the polyphase winding of an alternator adapted to connect to an electrical load.

15. Apparatus as claimed in claim 14 in which the second armature is a conductive shell attached to said shaft in a manner that allows relative angular motion between the shell and the shaft.

16. Apparatus as claimed in claim 15 in which the moment of inertia of the shell is large enough so that relative displacement between the shell and the rotating field winding, in the event of electrical fault in the circuit of the first armature of an operating system, is relatively small, thereby absorbing all or a significant fraction of the alternating fault current by electromagnetic interaction between the field of the armature fault current and the current induced in the shell during the fault by the field of the armature fault current.

17. Apparatus as claimed in claim 14 in which the second armature is a conductive inertial shell which is free spinning upon said shaft.

18. Apparatus as claimed in claim 17 in which the moment of inertia of the shell is large enough so that relative displacement between the shell and the rotating field winding, in the event of electrical fault in the circuit of the first armature of an operating system, is relatively small, thereby absorbing all or a significant fraction of the alternating fault torque by electromagnetic interaction between the field armature fault current and the electric currents induced in the shell during the fault.

19. A dual-armature superconducting machine that comprises, in combination: superconductor field winding means adapted to provide a high intensity D-C field; first armature means having a normally conducting, full-turn winding for conducting an armature current; second armature means having portions adapted to carry electric current; both the first and second armature means being normally conducting and being disposed in the region of influence of the superconductor field so that flux lines of the magnetic field link the winding of the first armature means and the electrically conductive portions of the second armature means, the current in each armature means interacting with the D-C field to provide reaction forces therebetween, the reaction force created by the current in the second armature means acting to counteract the reaction force created by the current in the first armature means thereby to allow a substantial portion of the reaction forces to be taken up by the normally conducting armature means and thus lessen the net interacting reaction force of the first and second armature means on the superconductor field winding means.

* * * * *

UNITED STATES PATENT OFFICE
CERTIFICATE OF CORRECTION

Patent No. 3,742,265   Dated June 26, 1973

Inventor(s) Joseph L. Smith, Jr.

It is certified that error appears in the above-identified patent and that said Letters Patent are hereby corrected as shown below:

In the Abstract, line 2, before "by" insert -- or largely replaced --. Column 1, line 44, after "1970)." insert -- The use of superconducting windings to provide a field --. Column 2, line 14, "would" should read -- wound --; line 33, after "invention" insert -- is --. Column 5, line 1, after "inventor" insert -- and another, S. N. 257,640 filed May 30, 1972 --; line 31, after "current", second occurrence, insert a hyphen and: -- carrying conductors --; line 59, delete "are discussed in", second occurrence. Column 8, line 37, after "machine" insert -- ( i. e., the need for a ferromagnetic core is eliminated, but some magnetic material such as, for example, the magnet shield 22 may be employed in some parts of the magnetic circuit) --. Column 9, line 37, after "of" insert -- the --. Claim 7, line 6, "characterisitic" should read -- characteristics --.

Signed and sealed this 17th day of September 1974.

(SEAL)
Attest:

McCOY M. GIBSON JR.
Attesting Officer

C. MARSHALL DANN
Commissioner of Patents